(12) United States Patent
Liu

(10) Patent No.: US 7,055,235 B2
(45) Date of Patent: Jun. 6, 2006

(54) SLEEVE FOR CONNECTOR OF OPTICAL FIBERS AND METHOD OF MANUFACTURING SAME

(76) Inventor: Chin Ju Liu, No. 25, Lane 174, Sec. 2, Dong Hwa St., Bei Tou Dt., Taipei (TW)

( * ) Notice: Subject to any disclaimer, the term of this patent is extended or adjusted under 35 U.S.C. 154(b) by 0 days.

(21) Appl. No.: 10/791,728

(22) Filed: Mar. 4, 2004

(65) Prior Publication Data
US 2005/0193542 A1   Sep. 8, 2005

(51) Int. Cl.
*B23P 11/02* (2006.01)
(52) U.S. Cl. .......................... 29/447; 385/78
(58) Field of Classification Search ................. 29/447, 29/525; 385/60, 62, 72, 78
See application file for complete search history.

(56) References Cited

U.S. PATENT DOCUMENTS

| | | | | |
|---|---|---|---|---|
| 4,193,665 A | * | 3/1980 | Arnold ........................ 385/72 |
| 4,218,113 A | * | 8/1980 | Uberbacher ................. 385/72 |
| 4,761,191 A | * | 8/1988 | Keller et al. ................ 148/646 |
| 5,000,537 A | * | 3/1991 | Saito et al. .................. 385/55 |
| 5,111,520 A | * | 5/1992 | Kawanami et al. ........... 385/81 |
| 5,113,465 A | * | 5/1992 | Kawanami et al. ........... 385/82 |
| 5,123,072 A | * | 6/1992 | Kawanami et al. ........... 385/58 |
| 5,125,055 A | * | 6/1992 | Kawanami et al. ........... 385/58 |
| 5,278,928 A | * | 1/1994 | Ueda et al. ................... 385/78 |
| 5,621,834 A | * | 4/1997 | Anderson et al. ............. 385/72 |
| 5,703,982 A | * | 12/1997 | Takizawa ..................... 385/78 |
| 5,980,118 A | * | 11/1999 | Henningsson et al. ........ 385/88 |
| 6,101,703 A | * | 8/2000 | Odanaka ...................... 29/447 |
| 6,142,677 A | * | 11/2000 | Sato et al. .................... 385/72 |
| 6,179,478 B1 | * | 1/2001 | Shouji et al. ................. 385/70 |
| 6,213,649 B1 | * | 4/2001 | Omiya et al. ................. 385/60 |
| 6,450,696 B1 | * | 9/2002 | Omiya et al. ................. 385/72 |
| 6,896,417 B1 | * | 5/2005 | Kobayashi et al. ........... 385/72 |
| 2002/0172471 A1 | * | 11/2002 | Slater et al. ................... 385/78 |

* cited by examiner

*Primary Examiner*—Essama Omgba
(74) *Attorney, Agent, or Firm*—Troxell Law Office, PLLC

(57) ABSTRACT

A process of manufacturing a sleeve for connector of optical fibers comprises shaping a member made of stainless steel into a hollow cylinder, forming at least one portion to be heated on an outer circumferential surface of the cylinder, inserting a cylindrical rod into a bore of the cylinder, melting the portion to be heated by laser, cooling for contracting the bore of the cylinder onto the rod, and removing the cool rod from the cylinder to produce the finished sleeve having a tolerance within 1 μm. The invention has advantages of a finished sleeve having a tolerance within 1 μm, no further quality check required, and high production.

1 Claim, 1 Drawing Sheet

SLEEVE FOR CONNECTOR OF OPTICAL FIBERS AND METHOD OF MANUFACTURING SAME

BACKGROUND OF THE INVENTION

1. Field of the Invention

The present invention relates to sleeves for connectors of optical fibers and more particularly to a sleeve for connector of optical fibers and method of manufacturing same with improved characteristics.

2. Description of Related Art

Conventionally, a connector of optical fibers is provided at a connecting point of either an optical source and a bundle of optical fibers or an optical detection member and a bundle of optical fibers. A connector for splicing a bundle of quartz optical fibers comprises a ferrule for fastening the bundle of optical fibers. The ferrule is then coupled to an optical relay for transmitting light and images to a distal place. A metal seat is provided in the relay. Also, a sleeve is coaxially provided in the seat. One end of the sleeve is coupled to an optical source or optical member. The ferrule is coupled to or disengaged from the sleeve in an axial direction. Hence, a coupling loss between an optical source and a bundle of optical fibers or between a bundle of optical fibers and an optical detection member can be determined by a tolerance of gap between the coupled sleeve and the ferrule. Obviously, the tolerance must fall within a limit. Typically, a ferrule having a diameter 2.499 mm can be inserted into a sleeve or removed from the same in which the bundle of optical fibers is required to align with the optical source or the optical detection member. For achieving the above purposes, an inner diameter of the sleeve is required to be about 2.500 mm.

A sleeve is typically made of ceramic. A process of manufacturing sleeve comprises forming a hollow cylinder by injection molding powder ceramic material, sintering the hollow cylinder, inserting a diamond rod into a bore of the cylinder to grind, and polishing an outer circumferential surface of the cylinder. However, the finished sleeve may not pass quality control. Thus, it is typical to check each finished product. This is a time consuming process. Further, dust may be generated from the powder. This is not healthy and may damage the environment. Furthermore, grinding and polishing equipments are expensive. Moreover, its production is low and the manufacturing cost is relatively high. In addition, tolerance of an inner diameter of sleeve is required to be within 1 µm. However, the well known grinding equipment can only realize a tolerance within 3 µm. As an end, the prior technique has a low yield. Thus, the need for improvement still exists.

SUMMARY OF THE INVENTION

It is an object of the present invention to provide a process of manufacturing a sleeve for connector of optical fibers comprising shaping a member made of stainless steel into a hollow cylinder; forming at least one portion to be heated on an outer circumferential surface of the cylinder; inserting a cylindrical rod into a bore of the cylinder; melting the portion to be heated by laser; cooling for contracting the bore of the cylinder onto the rod; and removing the cool rod from the cylinder to produce the finished sleeve having a tolerance within 1 µm. By utilizing the present invention, advantages such as a finished sleeve having a tolerance within 1 µm, no further quality check required, and high production can be obtained.

The above and other objects, features and advantages of the present invention will become apparent from the following detailed description.

DETAILED DESCRIPTION OF THE PREFERRED EMBODIMENTS

Figure 2:
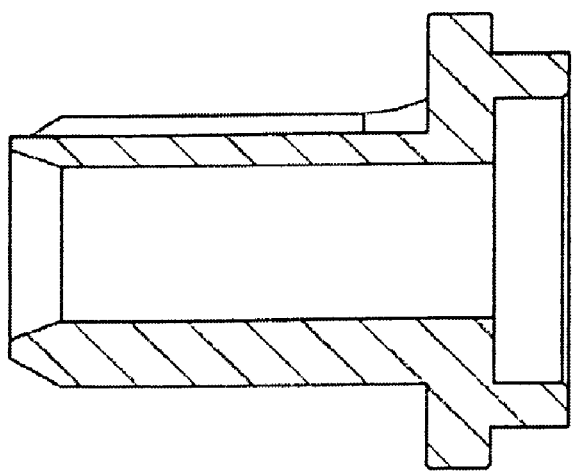
FIG. 2 shows a sectional view of the present invention.
Figure 1:
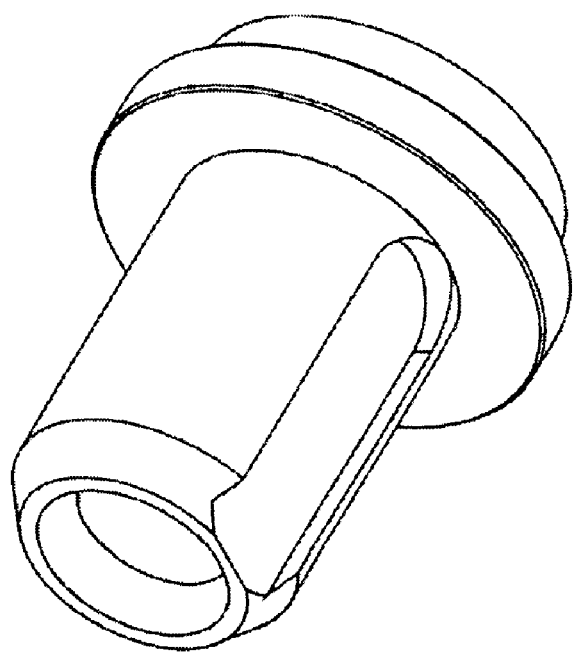
FIG. 1 shows a perspective view of the present invention.

A process of manufacturing a sleeve (FIGS. 1–2) for connector of optical fibers comprises shaping a suitable member made of stainless steel such as SUS304 or SUS316 into a hollow cylinder having an inner diameter of 2.505 mm, an outer diameter 4.7 mm, and a length of 9 mm by machining on a lathe, forming at least one portion to be heated on an outer circumferential surface of the cylinder wherein the portion to be heated is a recessed flat, a straight groove, or an annular groove having a depth about one-half of thickness of the cylinder, inserting a cylindrical ceramic rod having a length of 20 mm and a diameter of 2.499 mm into a bore of the cylinder, melting the portion to be heated in about one second by means of one or more laser guns, cooling for contracting the bore of the cylinder onto the ceramic rod, and removing the cool ceramic rod from the cylinder for forming a sleeve having an inner diameter 2.500 mm with tolerance within 1 µm.

In an alternative embodiment, a sleeve having an inner diameter in the range of 1.250 mm to 0.126 mm with tolerance within 1 µm can be produced if the ceramic rod has a diameter in the range of 1.249 mm to 0.125 mm. Also, a sleeve having a larger inner diameter in the range of 2.0 mm to 3.0 mm, a smaller inner diameter in the range of 0.25 mm to 1.25 mm, or a much smaller inner diameter in the range of 0.25 mm to 0.9 mm with tolerance within 1 µm can be produced.

The benefits of the invention include: A finished sleeve has a tolerance within 1 µm. No further quality check is required (i.e., yield is high). Production is high.

While the invention herein disclosed has been described by means of specific embodiments, numerous modifications and variations could be made thereto by those skilled in the art without departing from the scope and spirit of the invention set forth in the claims.

What is claimed is:

1. A process of manufacturing a sleeve for connector of optical fibers comprising:
   a) shaping a member made of stainless steel into a hollow cylinder;
   b) forming at least one groove on an outer circumferential surface of the cylinder by performing the steps of:
      i) inserting a cylindrical rod into a bore of the cylinder;
      ii) melting a portion to be heated and forming the groove utilizing a laser;
      iii) cooling for contracting the bore of the cylinder onto the rod; and
      iv) removing the rod when cooled from the cylinder producing a finished sleeve having a tolerance within 1 µm,
   wherein the portion to be heated has a depth about one-half of thickness of the cylinder.

* * * * *